US011323956B2

(12) United States Patent
Guo

(10) Patent No.: US 11,323,956 B2
(45) Date of Patent: May 3, 2022

(54) METHOD FOR OPERATING A DEVICE DURING AN UNAVAILABILITY TIME PERIOD

(71) Applicant: ORANGE, Paris (FR)

(72) Inventor: Zhihong Guo, Beijing (CN)

(73) Assignee: Orange, Paris (FR)

(*) Notice: Subject to any disclaimer, the term of this patent is extended or adjusted under 35 U.S.C. 154(b) by 0 days.

(21) Appl. No.: 16/472,746

(22) PCT Filed: Dec. 14, 2017

(86) PCT No.: PCT/IB2017/001696
§ 371 (c)(1),
(2) Date: Jun. 21, 2019

(87) PCT Pub. No.: WO2018/115968
PCT Pub. Date: Jun. 28, 2018

(65) Prior Publication Data
US 2020/0396330 A1 Dec. 17, 2020

(30) Foreign Application Priority Data

Dec. 23, 2016 (WO) ................ PCT/CN2016/111612

(51) Int. Cl.
H04W 52/02 (2009.01)
H04W 4/30 (2018.01)
H04M 3/42 (2006.01)
H04M 3/436 (2006.01)
H04W 4/20 (2018.01)
H04M 3/02 (2006.01)
H04M 19/04 (2006.01)

(52) U.S. Cl.
CPC ....... H04W 52/02 (2013.01); H04M 3/42051 (2013.01); H04M 3/436 (2013.01);
(Continued)

(58) Field of Classification Search
CPC .......... H04W 4/30; H04W 88/02–028; H04W 92/08; H04W 4/20; H04M 3/02;
(Continued)

(56) References Cited

U.S. PATENT DOCUMENTS 8,615,221 B1 * 12/2013 Cosenza ............. H04W 68/005
455/414.1
8,817,000 B1 * 8/2014 Sauvage ................. H02S 50/00
345/207
(Continued)

FOREIGN PATENT DOCUMENTS

CN 103561152 A 2/2014
CN 105117211 A 12/2015
(Continued)

OTHER PUBLICATIONS

International Search Report from the International Application No. PCT/IB2017/001696 dated Mar. 23, 2018.

Primary Examiner — San Htun
(74) Attorney, Agent, or Firm — Haverstock & Owens, A Law Corporation

(57) ABSTRACT

The present invention relates to a method for operating a device characterized in that it comprises the following steps of, performed by a processing unit of the device:
determining (a) that a notification is to be outputted through a user interface of the device during an unavailability time period;
postponing (b) outputting said notification until after the occurrence of an event indicative of the availability of a user of the device.

12 Claims, 3 Drawing Sheets

(52) U.S. Cl.
CPC ............... *H04W 4/20* (2013.01); *H04W 4/30*
(2018.02); *H04W 52/0251* (2013.01); *H04W*
*52/0261* (2013.01); *H04W 52/0267* (2013.01);
*H04M 3/02* (2013.01); *H04M 3/42365*
(2013.01); *H04M 19/04* (2013.01); *H04M*
*2201/14* (2013.01); *H04M 2203/2072*
(2013.01)

(58) Field of Classification Search
CPC ............. H04M 3/436; H04M 3/42051; H04M
3/42365; H04M 19/04; H04M 2201/14;
H04M 2203/2072
See application file for complete search history.

(56) References Cited

U.S. PATENT DOCUMENTS

| | | | | |
|---|---|---|---|---|
| 9,357,063 | B1* | 5/2016 | Hertzfeld | H04L 67/306 |
| 2006/0264197 | A1* | 11/2006 | Mahini | H04M 1/72522 |
| | | | | 455/343.5 |
| 2009/0018785 | A1* | 1/2009 | Huseth | G01R 31/3648 |
| | | | | 702/63 |
| 2009/0292487 | A1* | 11/2009 | Duncan | G01R 31/3648 |
| | | | | 702/63 |
| 2010/0003950 | A1* | 1/2010 | Ray | H04M 3/5116 |
| | | | | 455/404.1 |
| 2010/0151918 | A1* | 6/2010 | Annambhotla | G01R 31/3648 |
| | | | | 455/573 |
| 2014/0181843 | A1 | 6/2014 | Yang | |
| 2015/0143281 | A1* | 5/2015 | Mehta | G06Q 10/10 |
| | | | | 715/781 |
| 2016/0007290 | A1* | 1/2016 | Lindemann | H04W 52/0254 |
| | | | | 370/311 |
| 2016/0073351 | A1* | 3/2016 | Cardozo | G06F 1/28 |
| | | | | 455/574 |

FOREIGN PATENT DOCUMENTS

| | | |
|---|---|---|
| EP | 1 452 988 A1 | 9/2004 |
| WO | 2011141624 A1 | 11/2011 |

* cited by examiner

METHOD FOR OPERATING A DEVICE DURING AN UNAVAILABILITY TIME PERIOD

FIELD OF THE INVENTION

The field of this invention is that of devices such as mobiles phones. More particularly, the invention relates to a method for operating such a device during an unavailability time period.

BACKGROUND OF THE INVENTION

With devices such as mobile phones, notifications of events such as an incoming call or reception of a SMS will raise sound, vibrations and/or light on the screen of the mobile phones. In some circumstances, such notification will bring interference to users. For instance, if the notification occurs during the night, it could wake up the user. Furthermore, it has to be noted that generally if the user "ignores" a notification, it is outputted again 2 minutes later, and sometimes even several more times.

In order to avoid disturbance by such notifications, it has been proposed (for example in iOS operating system) to provide the user with a "Do not Disturb" function which allows to schedule a time period during which disturbing notifications are forbidden. This function may be configured so as to allow some notifications, for example from a specific contact groups, or if someone calls you twice within three minutes.

However, such a system depends entirely on the user's input and is thus prone to human errors. Besides, when a notification is raised during a scheduled "Do Not Disturb" time period, this notification is simply silenced and the user is thus not notified of the situation once the scheduled "Do not disturb" time period is over.

There is therefore a need for improving the user experience so as to avoid bothering him with notifications when he is not available, without risking him to miss some notifications.

SUMMARY OF THE INVENTION

For these purposes, the present invention provides a method for operating a device characterized in that it comprises the following steps of, performed by a processing unit of the device:
determining that a notification is to be outputted through a user interface of the device during an unavailability time period;
postponing outputting said notification until after the occurrence of an event indicative of the availability of a user of the device.

Such postponement of notifications prevents that the user be bothered by the notifications while he is unavailable, without having to purely silence them as it is the case for the "Do Not Disturb" mode. The situation is simply resumed when he is available again.

Preferred but non limiting features of the present invention are as follow:
said event indicative of the availability of a user of the device is chosen among the expiration of said unavailability time period, and an interaction of a user with the user interface;
the postponing step further comprises a step of monitoring if there is an active interaction of a user with the user interface during the unavailability time period;
the method comprises a previous step of automatically detecting said unavailability time period;
the unavailability time period is detected by accessing an agenda of the user stored in a memory unit of the device, or a set alarm clock;
the device is powered by a battery, and the determining step comprising estimating a remaining battery lifetime and a remaining duration of said unavailability time period, step (b) being performed only if the remaining battery lifetime is greater than the remaining duration of said unavailability time period;
the remaining battery lifetime is estimated as a function of a current battery level and an average power consumption;
the determining step further comprises determining whether the notification is assigned a low priority level, the postponing step being performed only if the notification is assigned a low priority level;
the determining step further comprises determining whether the notification is assigned a high priority level, the postponing step being performed only if the notification is not assigned a high priority level;
the determining step further comprises normally outputting said notification if the postponing step is not performed;
the device is powered by a battery, said notification being a low battery notification.

In a second aspect, the invention provides an electronic device comprising a user interface and a processing unit configured to implement:
determining that a notification is to be outputted through the user interface during an unavailability time period;
postponing outputting said notification until after the occurrence of an event indicative of the availability of a user of the device.

According to a third and a fourth aspects, the invention provides a computer program product, comprising code instructions for executing a method according to the first aspect for operating a device; and a computer-readable medium, on which is stored a computer program product comprising code instructions for executing a method according to the first aspect for operating a device.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1:
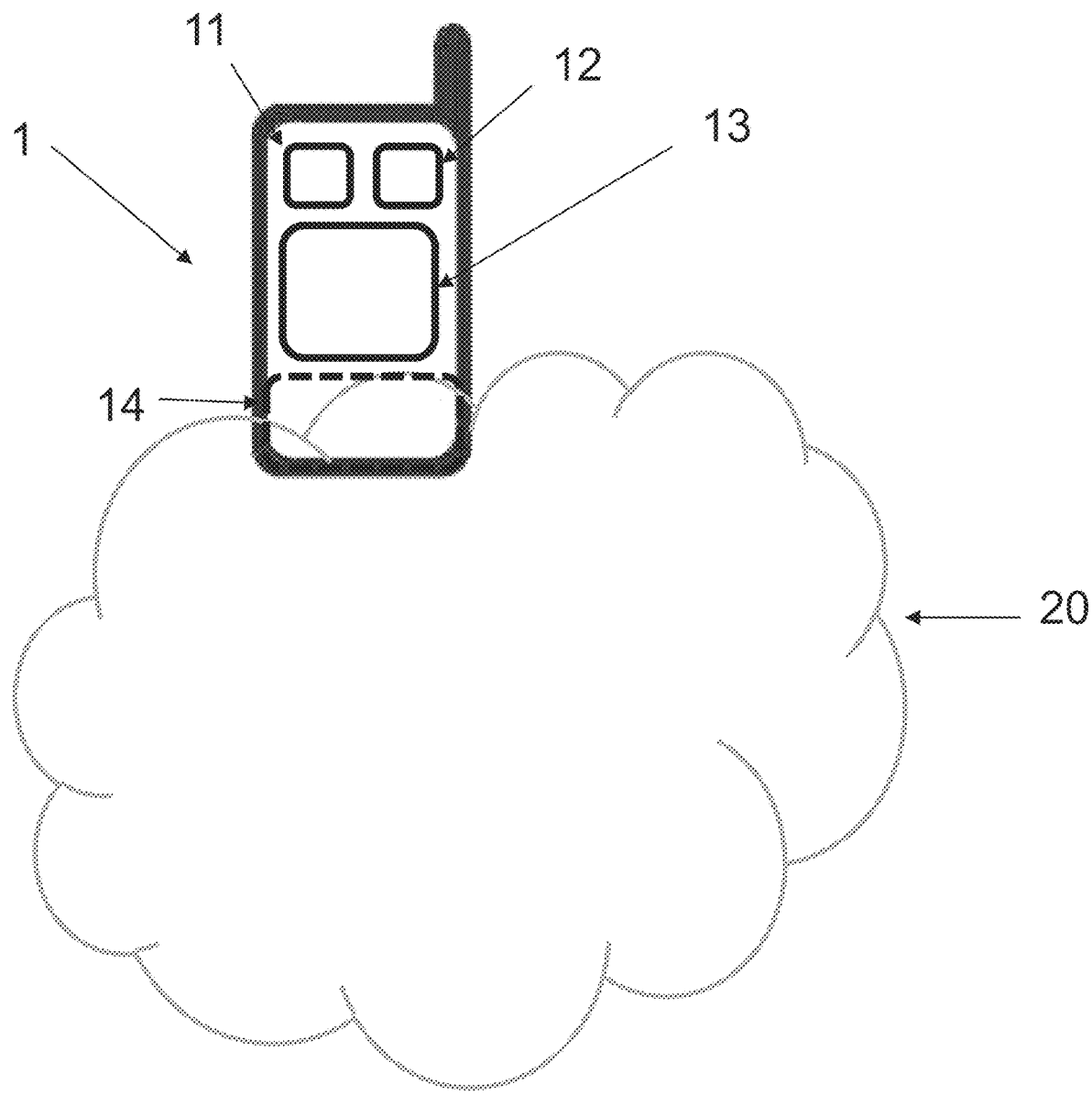
FIG. 1 illustrates an example of architecture in which the method according to the invention is performed.

The present invention relates to a method for operating a device 1 as represented by FIG. 1. As explained the device comprises a processing unit 11, i.e. a CPU (one of mode processors).

The device 1 typically further comprises a memory 12 (for example flash memory) and a user interface 13 which typically includes a screen (possibly touch sensitive), loudspeakers and a vibration module.

The device 1 also comprises a battery 14, in particular a rechargeable battery (for instance lithium polymer) for powering the processing unit 11 and other units.

The device 1 may further comprise others units such as a location unit for providing location data representative of the position of the device 1 (using for example GPS, network triangulation, etc.), a communication unit for connecting (in particular wirelessly) the device 1 to a network 20 (for example WiFi, Bluetooth, and preferably a mobile network, in particular a GSM/UMTS/LTE network, see below), etc.

This device 1 is typically a smartphone, a tablet computer, a laptop, etc. In the following description the example of a smartphone will be used.

Figure 2:
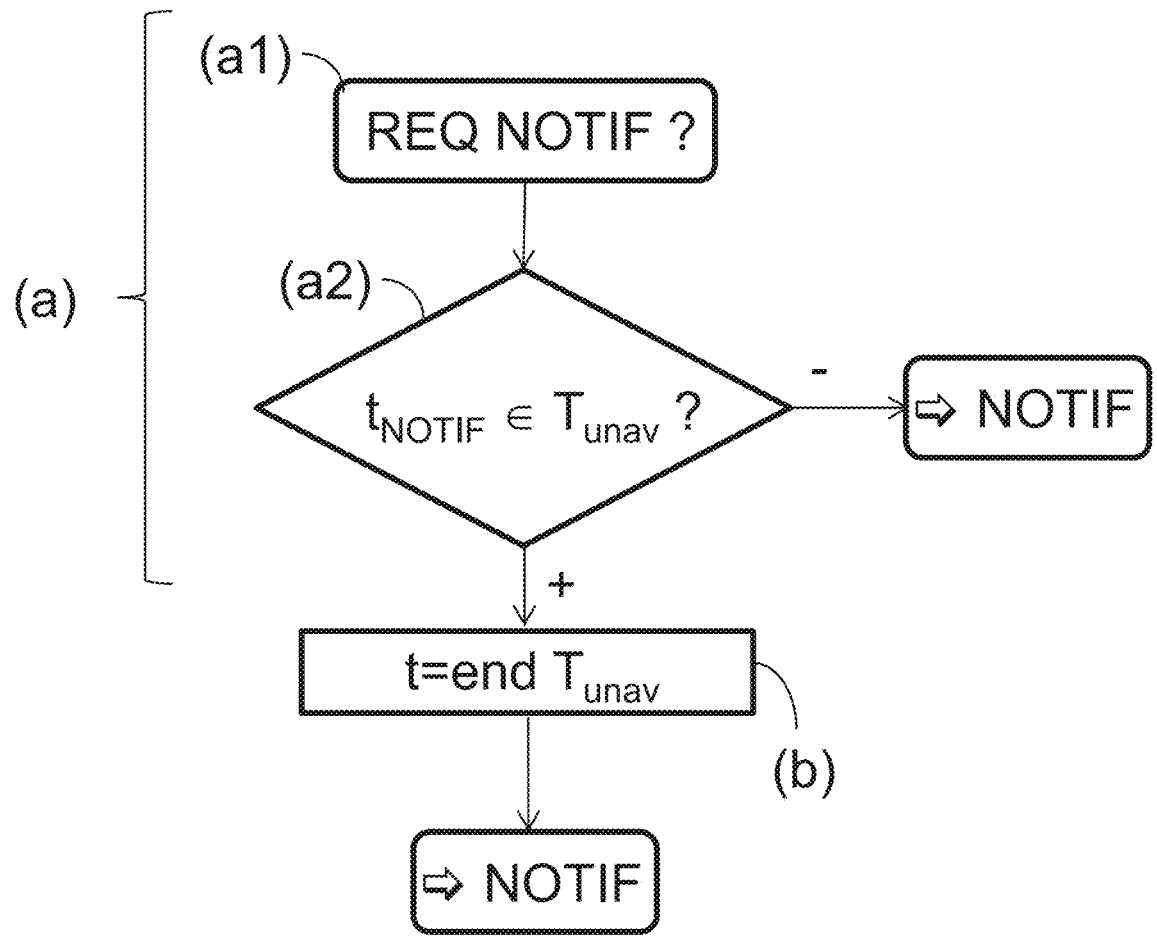
FIG. 2 illustrates a first embodiment of the method according to the invention.
Figure 3:
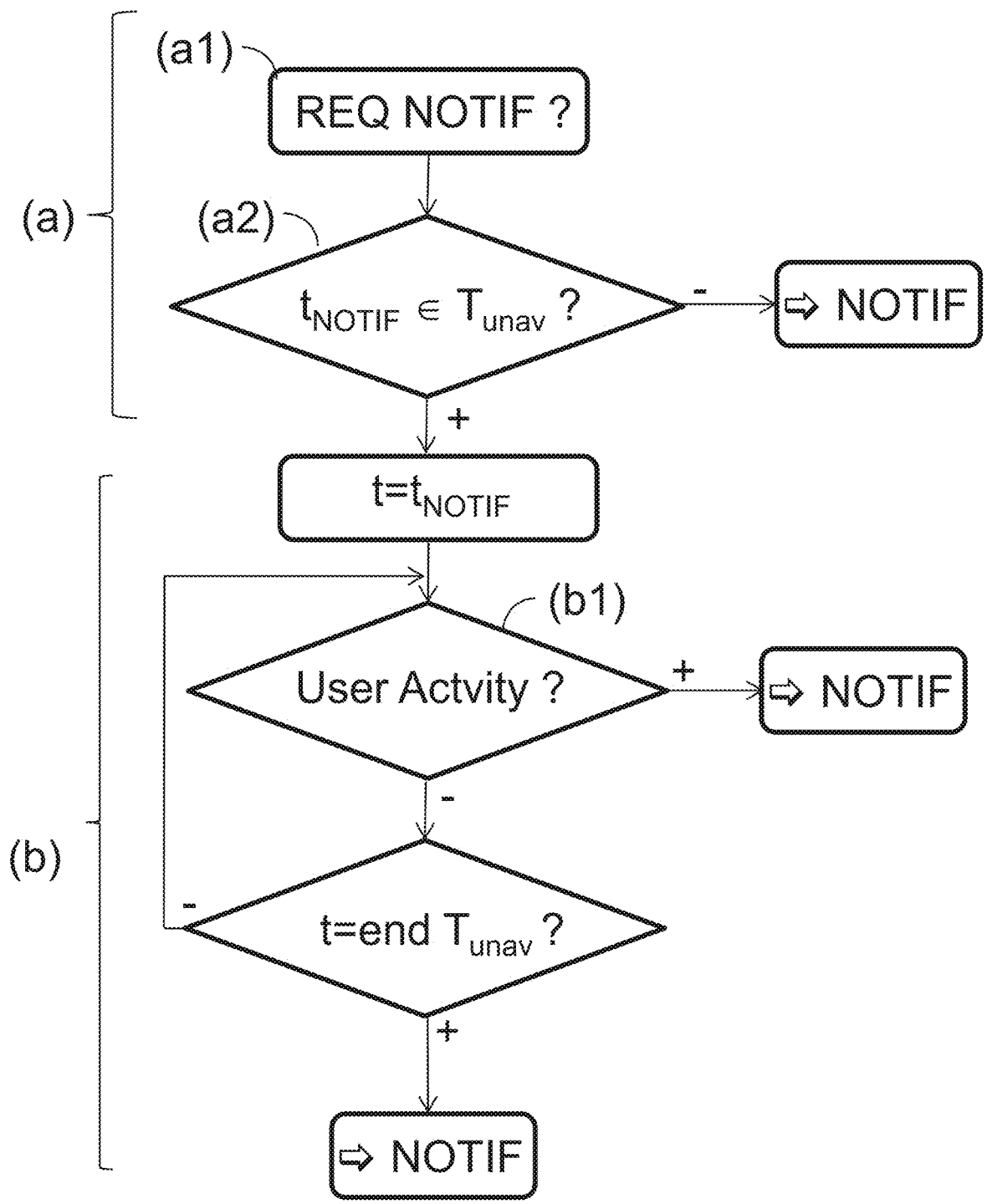
FIG. 3 illustrates a second embodiment of the method according to the invention.

We refer now to FIGS. 2 and 3 which illustrate two embodiments of the method according to the present invention.

Notification

In all the embodiments of the method according to the present invention, in a first step (a), the processing unit 11 determines that a notification is to be outputted (i.e. is being requested to output a notification) through the user interface 13 of the device 1 during a specific time period $T_{unav}$, designated hereafter as "unavailability time period", wherein a user of the device 1 is not available.

In other words, the processing unit 11 either receives this notification from the communication unit (the notification is thus a call, a SMS, an e-mail, an alert from an application etc.), i.e. is requested from another equipment to output the notification, or detects that a given event triggering a notification is occurring (for instance the battery level is below a given threshold such as 10% or 20%, the notification being a "low battery" notification—such example will be illustrated as preferred example in the following description), i.e. generates itself the notification.

In both cases, in the conventional art, the processing unit 11 would normally output the notification on the spot in particular by raising sound through the loudspeakers, a vibrating alert through the vibration module and/or light on the screen of the user interface 13.

In the present invention, however, after having determined that a notification is to be outputted (step (a1)), the processing unit 11 checks (step (a2)) if the moment $t_{NOTIF}$ when the notification is to be outputted occurs during the unavailability time period $T_{unav}$.

In a first embodiment, this unavailability time period $T_{unav}$ is manually configured and/or scheduled by the user (like the "Do not Disturb" mode), for instance during the night.

In the second embodiment, this unavailability time period $T_{unav}$ is automatically detected in a previous step (a0). For instance, this automatic detection can be performed in various ways:
- if the processing unit 11 is aware of a set alarm clock, it can be assumed that the time period between setting the alarm time and the alarm time defines the unavailability time period $T_{unav}$, especially if the alarm time is in the morning (this time period extending during the night);
- by having access to the user's agenda stored in the memory 12 (or accessible through the network 20), the processing unit 11 can be aware of planned events such as meetings during which the user should not be disturbed;
- the processing unit 11 can also determine that the user is currently driving (e.g. because the device 1 is plugged in the car or because the user has inputted a route on a navigation system of the device 1) and that the user should not be disturbed during this activity;
- using supervised learning algorithms, the processing unit 11 can infer the habits of the user and know at which moments of the day he is generally unavailable.

In the following description, the preferred example of a set alarm time will be used as an indication of an unavailability time period extending up to said alarm time.

It is to be noted that if it is determined that the moment $t_{NOTIF}$ when the notification is to be outputted does not occur during an unavailability time period $T_{unav}$, the notification is normally outputted (i.e. at $t_{NOTIF}$, i.e. on the spot if the notification is to be outputted immediately).

Postponement of Notification

When having determined that the moment $t_{NOTIF}$ of the output of the notification occurs during the unavailability time period $T_{unav}$, the method comprises a step (b) whereby the output of the notification is postponed until the occurrence of an event indicative of the availability of the user of device 1. In other words, the processing unit 11 is requested to output a notification, but do not fulfill it at once.

Various events could be indicative of the availability of a user of the device 1. In particular, there could be one or a plurality of events triggering the postponement of the notification outputting.

Advantageously, a set of said events indicative of the availability of a user of the device 1 comprises at least the expiration of said unavailability time period $T_{unav}$ and/or an interaction of a user with the user interface 13 during the unavailability time period $T_{unav}$.

In a first embodiment more specifically illustrated by FIG. 2, such an event consists in the expiration of the unavailability time period $T_{unav}$ (i.e. said set of possible events indicative of the availability of a user of the device 1 only comprises the expiration of said unavailability time period).

In the following step (b) of this embodiment, the outputting of said notification is postponed until after the expiration of this unavailability time period $T_{unav}$, that is to say either right after the expiration of this unavailability time period $T_{unav}$ or at a later moment occurring at a predetermined time shortly after this expiration (for instance a few seconds after the expiration).

In other words, for a request at the moment $t_{NOTIF}$ to output immediately a notification during the unavailability time period, instead of being immediately outputted, the notification is only outputted when the unavailability time period is over. Alternatively, for a request to output a notification at a later given time $t_{NOTIF}$ occurring during the unavailability time period, the notification is not outputted at the given time $t_{NOTIF}$, but outputted after the unavailability time period is over.

For example, as explained when the battery power level of the device 1 drops below a threshold (such as 20%), a low battery notification is to be triggered. Outputting this notification would play sound and light on the screen to notify the user to charge the battery. If the user has set an alarm that will ring at 6:00 AM, but the low battery threshold is hit at 5:00 AM, the remaining power of the phone is highly likely to be enough to sustain one more hour and thus the notification could be postponed after that alarm at 6:00 AM is triggered, so as to avoid bringing unnecessary interference to the user.

In other words, in this example the processing unit 11 detects an unavailability time period $T_{unav}$ extending up to the alarm time of 6:00 AM (step (a0)), and then is being requested to output the power battery notification at 5:00 AM (step (a)). Because this request occurs during said unavailability time period, the outputting of the notification is not immediately performed, but postponed up to the end of said unavailability time period, i.e. 6:00 AM (step (b)).

Consequently, the user is not bothered by the notification when he is not available, but is informed when he is available again (and able to respond to the notifications). Furthermore, there is no more risks of missing some notifications like in the "Do Not Disturb" mode in which they were silenced. Finally, it even saves battery as outputting a notification is often quite power consuming (because of sound/light/vibrations), in particular if the outputting is repeated because the user ignores the notification.

In another embodiment more specifically illustrated by FIG. 3, the event indicative of the availability of a user of the device 1 may also consist in the detection of an interaction of a user with the user interface 13 during the unavailability time period $T_{unav}$.

During the following step (b) of this other embodiment, starting from the moment $t_{NOTIF}$ when the notification should have being outputted if it was not during the unavailability time period $T_{unav}$, there is a further step (b1) of monitoring if there is an interaction of a user with the user interface 13 during the unavailability time period $T_{unav}$. Such an interaction can be the user turning on the screen of the user interface 13, for instance.

When such an interaction is detected by the processing unit 11, the notification is outputted after the occurrence of this interaction (and thus before the expiration of the unavailability time period), that is to say either right after this detected interaction or at a later moment occurring at a predetermined time shortly after this detected interaction (for instance a few seconds after this interaction).

Such a monitoring (b1) is performed (continuously or at regular times) until the expiration of the unavailability time period $T_{unav}$.

In the embodiment represented by FIG. 3, in the case where no interaction of the user with the user interface 13 has been detected before the expiration of this unavailability time period $T_{unav}$, then the notification is outputted after the expiration of the unavailability time period $T_{unav}$, similarly to the first embodiment illustrated in FIG. 2. In other words in this embodiment, both the detection of an interaction of a user with the user interface 13 during the unavailability time period $T_{unav}$, and the expiration of the unavailability time period $T_{unav}$, are events indicative of the availability of a user of the device 1 (i.e. there is a set of possible events indicative of the availability of a user of the device 1 comprising both the expiration of said unavailability time period and an interaction of a user with the user interface 13 during the unavailability time period).

It is to be understood that it may alternatively be provided that said set of possible events indicative of the availability of a user of the device 1 only comprises an interaction of a user with the user interface 13 (i.e. if there is still no interaction of the user after the end of the unavailability time period, the notification is not outputted until such an interaction is detected), in order to be sure not to bother the user if his/her unavailability happens to be longer than initially expected.

Moreover, in all embodiments the notification postponement may only be performed for specific notifications, considered as relatively less important notifications, such as low battery notifications or application crash notifications. In another embodiment, some specific types of notifications, considered this time as relatively more important ones, such as calls, SMS or notifications from a given list of contacts for instance, are still to be outputted without delay by the user interface 13, even when their notification moment $T_{NOTIF}$ occur during the unavailability time period For that purpose, a priority level (typically user-defined) may be assigned to notifications. A low priority level may thus be assigned to the above-mentioned relatively less important notifications while a high priority level may be assigned to the relatively more important notifications.

In such an embodiment, the method advantageously comprises, after having determined that a notification is to be outputted, a further step of determining whether the notification is assigned a low priority level, the step (b) of postponing being implemented only when that it is the case. Alternatively, the method advantageously comprises, after having determined that a notification is to be outputted, a further step of determining whether the notification is assigned a high priority level, the step (b) of postponing being implemented only when that it is not the case.

Remaining Battery Lifetime

In a preferred embodiment (particularly advantageous if the notification is a low battery notification), the postponement of the notification should be carried out only if possible, i.e. only if the battery 14 can handle it.

In other words, step (a) further comprises estimating a remaining battery lifetime $T_{BLife}$ and a remaining duration of said unavailability time period $\Delta T_{unav}$, so as to have step (b) being performed only if the remaining battery lifetime $T_{BLife}$ is greater than the remaining duration of said unavailability time period $\Delta T_{unav}$. This embodiment allows ensuring that the notification is outputted before the device 1 runs out of battery.

More precisely, the processing unit 11 first checks if the notification can wait until the ending time of the unavailability time period $T_{unav}$ by calculating the expected remaining battery lifetime $T_{BLife}$ (for example from the operating system or an API such as the one available with Android OS) and by comparing it with the remaining duration of the unavailability time period $\Delta T_{unav}$ (i.e. the difference between the end time of the unavailability time period $T_{unav}$ and the present time).

If the system settings only shows the remaining battery level (i.e. the load percentage of the battery), a mechanism to calculate the remaining battery lifetime $T_{BLife}$ from this remaining battery level can be used. In particular, the remaining battery lifetime can be estimated as a function of a current battery level and an average power consumption. The average power consumption in the past x hours can be used as a basis. Alternatively statistics data, for example the average consumption in the past 1 month during the same time, can be used as the basis.

In a preferred embodiment, in order to avoid possible fluctuations of the remaining battery lifetime $T_{BLife}$ (if the user uses mobile applications which consume much more battery than planned in the meantime) as well as for allowing the user to respond the notification, a given time margin, for example 30 minutes, may be taken into account when deciding to postpone. In other words, step (b) is performed only if the remaining battery lifetime $T_{BLife}$ is greater by such a margin than the remaining duration of said unavailability time period $\Delta T_{unav}$. For instance, the notification can be postponed only if the end of the unavailability time period $T_{unav}$ occurs more than 30 minutes before the expected end of the remaining battery lifetime $T_{BLife}$.

It has to be understood that said remaining duration of the unavailability time period is in most cases calculable from (at least an estimation of) the moment of the event ending the unavailability time period (the time of this event is either known, for instance if the unavailability is detected using a calendar, or it may be estimated, for instance if the user is driving and is using a navigation application). If it were not to be determinable at all (if for example the user has manually activated a "Do not Disturb" mode), it may be decided that the notification is postponed as soon as the battery level is above a given threshold (for example 50%).

Naturally, in the previously embodiment where there is a user activity monitoring by the processing unit 11 during the unavailability time period, when a user interaction on the device is detected, thereby meaning that the user becomes available, the postponed notifications will be outputted without waiting for the expiration of the unavailability time period.

Device and Computer Program

The present invention further proposes an electronic device 1 comprising a user interface 13 and a processing unit 11, adapted for carrying out the method for operating as previously described. This device 1 may also comprise a memory 12, a battery 14. This processing unit 11 is configured to implement the steps of:
- optionally, detecting an unavailability time period of the user;
- determining that a notification is to be outputted through the user interface 13 during the unavailability time period;
- postponing outputting said notification until after the occurrence of an event indicative of the availability of a user of the device 1 (in particular only if the remaining battery lifetime is greater than the remaining duration of said unavailability time period).

The present invention further proposes a computer program product, comprising code instructions for executing (in particular with a processing unit 11 of the device 1) the previously described method as well as a computer-readable medium (in particular a memory 12 of the device 1), on which is stored a computer program product comprising code instructions for executing said method. In particular, this computer program product may correspond to a dedicated software application to be installed on said device 1.

The invention claimed is:

1. A method for operating a device (1) powered by a battery (14) characterized in that it comprises the following, performed by a processing unit (11) of the device (1):
   during an unavailability time period wherein a user of the device is not available, receiving or generating a notification that is to be outputted through a user interface (13) of the device (1) during said unavailability time period and estimating a remaining battery lifetime and a remaining duration of said unavailability time period; and
   if the remaining battery lifetime is greater than the remaining duration of said unavailability time period, postponing outputting said notification until after occurrence of an event indicative of availability of a user of the device (1), wherein said event indicative of the availability of a user of the device (1) is chosen among expiration of said unavailability time period and an interaction of a user with the user interface (13).

2. A method according to claim 1, wherein the postponing outputting said notification further comprises monitoring if there is an interaction of a user with the user interface (13) during the unavailability time period.

3. A method according to claim 1, comprising automatically detecting said unavailability time period before receiving or generating a notification that is to be outputted through a user interface (13) of the device (1) during an unavailability time period.

4. A method according to claim 3, wherein said unavailability time period is detected by accessing an agenda of the user stored in a memory unit (12) of the device (1), or a set alarm clock.

5. A method according to claim 1, wherein the remaining battery lifetime is estimated as a function of a current battery level and an average power consumption.

6. A method according to claim 1, wherein the receiving or generating of a notification that is to be outputted through a user interface (13) of the device (1) during an unavailability time period further comprises determining whether the notification is assigned a low priority level, the postponing outputting said notification being performed only if the notification is assigned a low priority level.

7. A method according to claim 1, wherein the receiving or generating of a notification that is to be outputted through a user interface (13) of the device (1) during an unavailability time period further comprises determining whether the notification is assigned a high priority level, the postponing outputting said notification being performed only if the notification is not assigned a high priority level.

8. A method according to claim 1, wherein the receiving or generating of a notification that is to be outputted through a user interface (13) of the device (1) during an unavailability time period further comprises normally outputting said notification if the monitoring is not performed.

9. A method according to claim 1, wherein the device (1) is powered by a battery (14), said notification being a low battery notification.

10. An electronic device (1) powered by a battery (14) comprising a user interface (13) and a processing unit (11) configured to implement:
    during an unavailability time period wherein a user of the device is not available, receiving or generating a notification that is to be outputted through the user interface (13) during said unavailability time period, the determining comprising estimating a remaining battery lifetime and a remaining duration of said unavailability time period; and
    if the remaining battery lifetime is greater than the remaining duration of said unavailability time period, postponing outputting said notification until after the occurrence of an event indicative of the availability of a user of the device (1), wherein said event indicative of the availability of a user of the device (1) is chosen among expiration of said unavailability time period and an interaction of a user with the user interface (13).

11. A device (1) powered by a battery (14) and comprising:
    a processing unit (11); and
    a non-transitory computer-readable medium storing a computer program product, the computer program product including code instructions that, when executed by the processing unit (11), perform steps comprising:
    during an unavailability time period wherein a user of the device is not available, receive or generate a notification that is to be outputted through a user interface (13) of the device (1) during said unavailability time period, the determining comprising estimating a remaining battery lifetime and a remaining duration of said unavailability time period; and if the remaining battery lifetime is greater than the remaining duration of said unavailability time period, postpone outputting said notification until after the occurrence of an event indicative of the availability of a user of the device (1), wherein said event indicative of the availability of a user of the device (1) is chosen among expiration of said unavailability time period and an interaction of a user with the user interface (13).

12. A non-transitory computer-readable medium storing, a computer program product including code instructions that, when executed by a processing unit (11), perform steps comprising:

during an unavailability time period wherein a user of the device is not available, receive or generate a notification that is to be outputted through a user interface (13) of a device (1) powered by a battery (14) during said unavailability time period, the determining comprising estimating a remaining battery lifetime and a remaining duration of said unavailability time period; and if the remaining battery lifetime is greater than the remaining duration of said unavailability time period, postpone outputting said notification until after the occurrence of an event indicative of the availability of a user of the device (1), wherein said event indicative of the availability of a user of the device (1) is chosen among expiration of said unavailability time period and an interaction of a user with the user interface (13).

\* \* \* \* \*